United States Patent
Lu et al.

(10) Patent No.: US 8,687,634 B2
(45) Date of Patent: Apr. 1, 2014

(54) METHOD FOR DIVERTING PACKET MULTIPLE TIMES, APPARATUS AND SYSTEM

(71) Applicant: Huawei Technologies Co., Ltd., Guangdong (CN)

(72) Inventors: Jinjun Lu, Beijing (CN); Chu Chen, Hangzhou (CN); Peng Hu, Beijing (CN)

(73) Assignee: Huawei Technologies Co., Ltd. (CN)

( * ) Notice: Subject to any disclaimer, the term of this patent is extended or adjusted under 35 U.S.C. 154(b) by 0 days.

(21) Appl. No.: 13/724,174

(22) Filed: Dec. 21, 2012

(65) Prior Publication Data

US 2013/0114603 A1     May 9, 2013

Related U.S. Application Data

(63) Continuation of application No. PCT/CN2012/072820, filed on Mar. 22, 2012.

(30) Foreign Application Priority Data

Mar. 31, 2011    (CN) .......................... 2011 1 0080393

(51) Int. Cl.
    *H04L 12/28*       (2006.01)
    *H04L 12/56*       (2006.01)
    *H04J 1/16*        (2006.01)

(52) U.S. Cl.
    CPC ..................................... *H04L 45/50* (2013.01)
    USPC ........................... 370/389; 370/282; 370/471

(58) Field of Classification Search
    CPC ...................................................... H04L 45/50
    USPC ............................................ 370/282, 389, 471
    See application file for complete search history.

(56) References Cited

U.S. PATENT DOCUMENTS

| | | | |
|---|---|---|---|
| 2004/0246957 A1 | 12/2004 | Grimminger | |
| 2006/0182127 A1 | 8/2006 | Park | |
| 2008/0002669 A1* | 1/2008 | O'Brien et al. | ......... 370/352 |
| 2010/0103837 A1* | 4/2010 | Jungck et al. | ......... 370/252 |

FOREIGN PATENT DOCUMENTS

| | | |
|---|---|---|
| CN | 1575581 A | 2/2005 |
| CN | 1822569 A | 8/2006 |

(Continued)

OTHER PUBLICATIONS

First office action issued in corresponding Chinese patent application 201110080393.8, dated Feb. 28, 2013, and English translation thereof, total 16 pages.

(Continued)

*Primary Examiner* — John Pezzlo
(74) *Attorney, Agent, or Firm* — Huawei Technologies Co., Ltd.

(57) ABSTRACT

Embodiments of the present invention disclose a method, an apparatus, and a system for diverting a packet multiple times between a master network device and multiple slave devices. The method includes: receiving a packet sent by a first slave device, where the packet includes an MPLS header that carries multi-diversion information, the multi-diversion information includes a multi-diversion identifier field, and the multi-diversion identifier field is used to indicate a slave device to which the packet needs to be diverted; determining, according to the multi-diversion identifier field, a second slave device to which the packet needs to be diverted; and sending the packet to the second slave device.

15 Claims, 8 Drawing Sheets

(56) References Cited

FOREIGN PATENT DOCUMENTS

| | | | |
|---|---|---|---|
| CN | 101568164 | A | 10/2009 |
| CN | 101764732 | A | 6/2010 |
| CN | 101984598 | A | 3/2011 |
| CN | 102143081 | A | 8/2011 |
| EP | 2079189 | A | 7/2009 |
| EP | 2568670 | A1 | 3/2013 |

OTHER PUBLICATIONS

Search report issued in corresponding European patent application No. 12762783.4, dated Apr. 29, 2013, total 6 pages.

Takahiro Miyamoto et al., "Customizing network functions for high performance cloud computing," Jul. 2009, total 4 pages.

M Cieslak et al., "Web cache communication protocol V2.0," Apr. 2001, total 44 pages.

* cited by examiner

METHOD FOR DIVERTING PACKET MULTIPLE TIMES, APPARATUS AND SYSTEM

This application is a continuation of International Application No. PCT/CN2012/072820, filed on Mar. 22, 2012, which claims priority to Chinese Patent Application No. 201110080393.8, filed on Mar. 31, 2011, both of which are hereby incorporated by reference in their entireties.

FIELD OF THE INVENTION

The present invention relates to the field of communication technologies, and in particular, to a method for diverting a packet multiple times, an apparatus, and a system.

BACKGROUND OF THE INVENTION

With the development of network technologies, functions of network devices are more diversified, and it is more necessary to analyze and monitor network traffic. Currently, a network is controlled primarily by monitoring traffic and packets by using the network devices. Different network devices place emphasis on different aspects of packet processing, and support different bandwidths. Therefore, various network devices generally need to be grouped into a cluster at the time of deployment, so that each network device in a same cluster may meet a packet processing requirement by means of collaborative analysis between each other. In this deployment, a packet may need to be diverted between network devices in the same cluster, so that a specific analysis requirement is processed by a specific network device. If the packet needs to be processed by multiple network devices in the cluster in turn, the packet needs to be diverted multiple times. Diversion refers to delivering a packet from one network device to another network device for processing, so that the another network device returns the packet after completion of the processing.

In the prior art, a virtual local area network (Vlan, Virtual Local Area Network) header is generally added in an original packet to implement that the packet is diverted between different network devices multiple times. Primarily, different meanings are defined for different fields in the Vlan header, and multi-diversion information is stored in the Vlan header. At the time of diverting, the Vlan header is added to the original packet. After receiving a packet with the Vlan header, each network device may know, through performing parsing processing on the Vlan header, which device the packet is to be diverted to, and how to divert the packet, thereby implementing that the packet is diverted between the network devices multiple times. One layer of Vlan header may carry 12-bit (bit) information. If more multi-diversion information needs to be carried, another layer of Vlan header needs to be added.

However, an existing standard protocol only supports a packet with two layers of Vlan header at most. In this way, 24-bit multi-diversion information may be carried at most, and carried multi-diversion information is rather limited.

SUMMARY OF THE INVENTION

Embodiments of the present invention provide a method for diverting a packet multiple times, an apparatus and a system, so that more multi-diversion information may be carried on the basis of compliance with an existing standard protocol.

A method for diverting a packet multiple times includes:
receiving a packet sent by a first slave device, where the packet includes a multi-protocol label switching (MPLS, Multi-Protocol Label Switching) header that carries multi-diversion information, the multi-diversion information includes a multi-diversion identifier field, and the multi-diversion identifier field is used to indicate a second slave device to which the packet needs to be diverted;
determining, according to the multi-diversion identifier field, the second slave device to which the packet needs to be diverted; and
sending the packet to the second slave device.

A network device includes:
a first receiving unit, configured to receive a packet sent by a first slave device, where the packet includes an MPLS header that carries multi-diversion information, the multi-diversion information includes a multi-diversion identifier field, and the multi-diversion identifier field is used to indicate a second slave device to which the packet needs to be diverted;
a determining unit, configured to determine, according to the multi-diversion identifier field, the second slave device to which the packet needs to be diverted; and
a sending unit, configured to send the packet to the second slave device.

A communication system includes a master device and at least one slave device attached to the master device, where the master device is the foregoing network device;
The slave device is configured to receive a packet sent by the master device, and send the packet to the master device, where the packet includes an MPLS header that carries multi-diversion information.

In the embodiments of the present invention, the MPLS header carries the multi-diversion information to implement that the packet is diverted between network devices multiple times. Relative to an existing Vlan header, the MPLS header may carry more information, and the existing standard protocol may also support 7 layers of MPLS header at most. Therefore, compared with an existing solution, the solution is more flexible, more convenient and more extensible, and more multi-diversion information may be carried on the basis of compliance with the existing standard protocol.

BRIEF DESCRIPTION OF THE DRAWINGS

To illustrate the technical solutions in the embodiments of the present invention or in the prior art more clearly, accompanying drawings required for describing the embodiments or the prior art are briefly introduced in the following. Apparently, the accompanying drawings in the following description are merely some embodiments of the present invention, and persons of ordinary skill in the art may further obtain other drawings according to these accompanying drawings without creative efforts.

DETAILED DESCRIPTION OF THE EMBODIMENTS

To make persons skilled in the art better understand the solutions of the present invention, the following clearly and completely describes the technical solutions in the embodiments of the present invention with reference to the accompanying drawings in the embodiments of the present invention. Apparently, the embodiments to be described are merely part rather than all of the embodiments of the present invention. All other embodiments obtained by persons of ordinary skill in the art based on the embodiments of the present invention without creative efforts shall fall within the protection scope of the present invention.

Figure 1A:
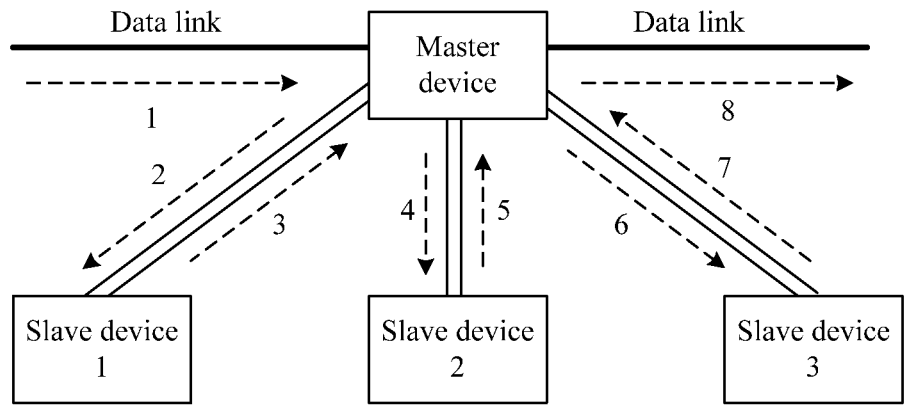
FIG. 1a is a schematic scenario diagram of diverting a packet multiple times according to an embodiment of the present invention.

In a network, several device clusters may be included. Each device cluster may include a master device and several slave devices. The master device is deployed in a network link, and the slave devices are attached to the master device. If in a master device link, there is a packet that needs to be processed by more than one slave device, the packet needs to be diverted multiple times within the cluster. For example, as shown in FIG. 1a, in this application scenario, the master device is deployed in the network link, a slave device 1, a slave device 2, and a slave device 3 are attached to the master device. The slave device 1, the slave device 2, and the slave device 3 may perform different processing on the packet. If a packet B needs to be diverted to the slave device 1, the slave device 2 and the slave device 3, as shown in FIG. 1a, a procedure of diverting the packet B multiple times may be as follows:

1. The master device receives the packet B from a data link (that is, a network link).

2. The master device sends the packet B to the slave device 1.

3. After receiving the packet B, the slave device 1 processes the packet B to obtain a packet B1, and returns the packet B1 to the master device.

4. The master device sends the packet B1 to the slave device 2.

5. After receiving the packet B1, the slave device 2 processes the packet B1 to obtain a packet B2, and returns the packet B2 to the master device.

6. The master device sends the packet B2 to the slave device 3.

7. After receiving the packet B2, the slave device 3 processes the packet B2 to obtain a packet B3, and returns the packet B3 to the master device.

8. The master device sends the packet B3 through the data link, for example, to a downstream device on the data link.

The embodiments of the present invention provide a method for diverting a packet multiple times, an apparatus, and a system, which are separately described in detail in the following.

Embodiment 1

This embodiment gives description from the perspective of a master device.

A method for diverting a packet multiple times includes: receiving a packet sent by a first slave device, where the packet includes an MPLS header that carries multi-diversion information, the multi-diversion information includes a multi-diversion identifier field, and the multi-diversion identifier field is used to indicate a slave device to which the packet needs to be diverted; determining, according to the multi-diversion identifier field, a second slave device to which the packet needs to be diverted; and sending the packet to the second slave device.

Before the packet sent by the first slave device is received, the method may further include: receiving an original packet sent by an uupstream device, and after adding an MPLS header that carries multi-diversion information to the original packet, sending the packet to the first slave device.

Figure 1B:
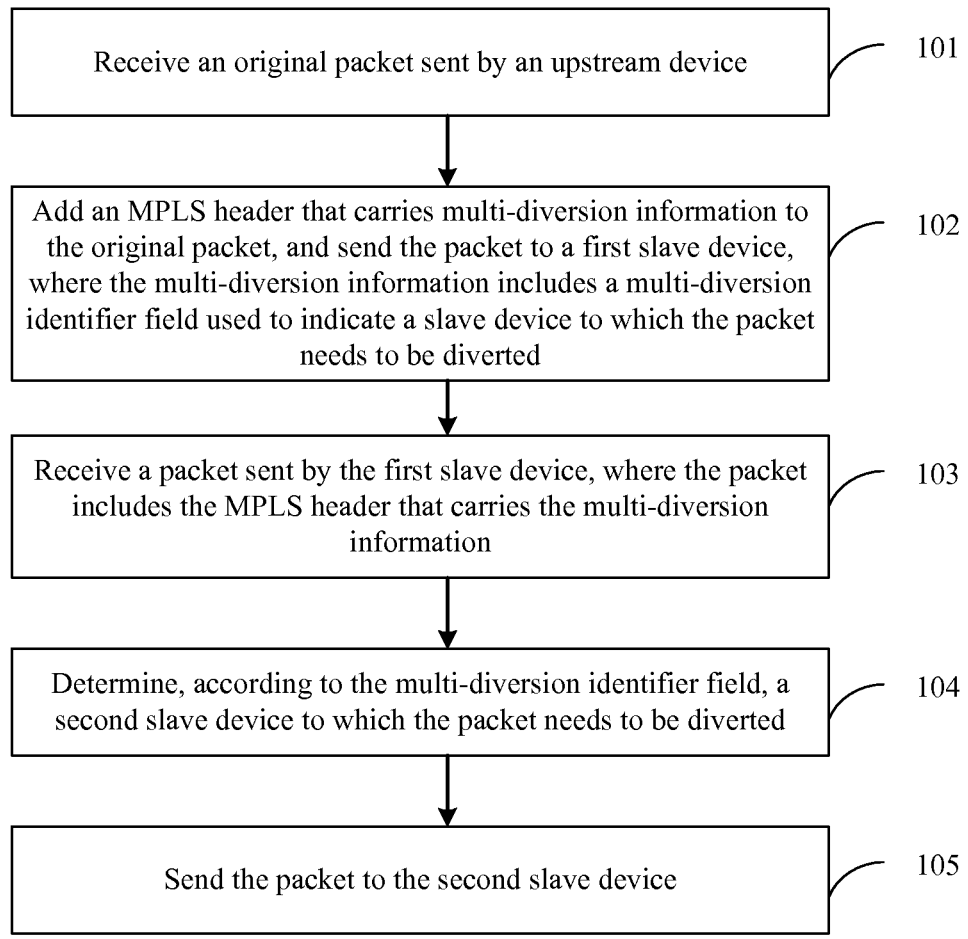
FIG. 1b is a flowchart of a method for diverting a packet multiple times according to an embodiment of the present invention.

As shown in FIG. 1b, a specific procedure may be as follows:

101: Receive an original packet sent by an uupstream device.

102: Add an MPLS header that carries multi-diversion information to the original packet, and send the packet to a first slave device (that is, a slave device in a current device cluster).

Figure 1C:
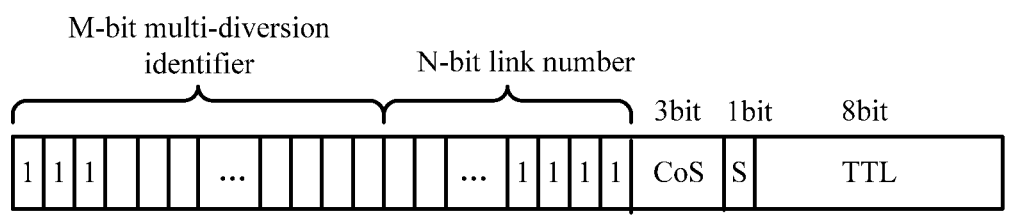
FIG. 1c is a schematic structural diagram of an MPLS header according to an embodiment of the present invention.

As shown in FIG. 1c, the multi-diversion information may include a multi-diversion identifier field. The multi-diversion identifier field is used to indicate a slave device or a slave device group to which the packet needs to be diverted (that is, used to indicate which slave device or slave device group the packet needs to be diverted to); in addition, the multi-diversion information may further include a link number field, and the link number field is used to indicate a link which is for receiving the original packet and in the master device. The number M of bits (bit) of the multi-diversion identifier field and the number N of bits of the link number field may be set according to actual application requirements. For example, the number M of bits of the multi-diversion identifier field may be set to 12, and the number of bits of the link number field may be set to 8; or the number M of bits of the multi-diversion identifier field may also be set to 14, and the number N of bits of the link number field may be set to 6, and so on.

It should be noted that, as shown in FIG. 1c, the MPLS header may further include a class of service (CoS, Class of Service) field, a stack (S, Stack) field, and a time-to-live (TTL, Time-to-Live) field. The CoS field is of 3 bits, the S field is of 1 bit, and the TTL field is of 8 bits.

The multi-diversion information may occupy idle bits which are in the MPLS header and specified in an existing MPLS protocol.

Therefore, in this case, the adding an MPLS header that carries multi-diversion information to the original packet may specifically be as follows:

(1) Add an identifier of the link for receiving the original packet to the link number field of the MPLS header. That is to say, the link number field indicates which link of the master device (the master device may include multiple links) the original packet enters over. In this way, after completion of diverting multiple times, the master device may find an egress port corresponding to an ingress port of the link according to the link number field, and send the packet. Specifically, a link number may be used as an identifier of the link.

(2) Identify, according to preset diversion order, all slave devices to which the packet needs to be diverted in the current device cluster (that is, a device cluster that the master device is in) in the multi-diversion identifier field of the MPLS header, for example, which may specifically be as follows:

Each slave device attached to the master device corresponds to at least one bit in the multi-diversion identifier field, and it is set that when the at least one bit is set to a first value, it indicates that the packet needs to be diverted to a corresponding slave device; therefore, in this case, the identifying, according to preset diversion order, all slave devices to which the packet needs to be diverted in the multi-diversion identifier field of the MPLS header may include:

determining at least one bit corresponding to each slave device according to the preset diversion order; and setting the at least one bit corresponding to each slave device to which the packet needs to be diverted to the first value.

The number of bits which are in the multi-diversion identifier field and correspond to each slave device and the first value may be preset according to a policy of an operator. For example, when each slave device corresponds to 1 bit in the multi-diversion identifier field, the first value may be set to 0 or 1; when each slave device corresponds to 2 bits in the multi-diversion identifier field, the first value may be set to 00, 01, 10, or 11, and the rest may be deduced by analogy. For ease of description, in this embodiment of the present invention, that the first value is specifically 0 or 1 and each slave device corresponds to one bit is taken as an example for description, which, for example, may be as follows:

Manner 1:

In the multi-diversion identifier field, set a corresponding bit for each slave device, and specify that when a bit is set to 1, it indicates that the packet needs to be diverted to a corresponding slave device; therefore, in this case, the identifying, according to the preset diversion order, all slave devices to which the packet needs to be diverted in the current device cluster in the multi-diversion identifier field of the MPLS header may specifically be:

determining a bit corresponding to each slave device according to the preset diversion order (that is, determining which slave device corresponds to which bit in the multi-diversion identifier field); and setting bits corresponding to all slave devices to which the packet needs to be diverted in the current device cluster to 1.

Manner 2:

In the multi-diversion identifier field, set a corresponding bit for each slave device, and specify that when a bit is set to 0, it indicates that the packet needs to be diverted to a corresponding slave device; therefore, in this case, the identifying, according to the preset diversion order, all slave devices to which the packet needs to be diverted in the current device cluster in the multi-diversion identifier field of the MPLS header may specifically be:

determining a bit corresponding to each slave device according to the preset diversion order (that is, determining which slave device corresponds to which bit in the multi-diversion identifier field); and setting bits corresponding to all slave devices to which the packet needs to be diverted in the current device cluster to 0.

After the MPLS header that carries the multi-diversion information is added to the original packet, the packet with the MPLS header may be diverted to the first slave device according to the preset diversion order, which, for example, may be as follows:

Start searching from one end of the multi-diversion identifier field of the MPLS header according to the preset diversion order; when a first first value (such as 1 or 0) is found through searching, divert the packet with the MPLS header to the first slave device, where the first slave device corresponds to a bit where the first first value is located.

The diversion order refers to arrangement order of the slave devices in the current device cluster at the time of diverting, that is, the diversion order of all slave devices to which the packet needs to be diverted. Specifically, the diversion order may be set according to a preset policy. For example, if in the master device, each slave device has a corresponding serial number, which is called a slave device serial number, in this case, the diversion order may be set to ascending order of the slave device serial number, or may be set to descending order of the slave device serial number, or may also be set to random order of the serial number. For example, N (N is a positive integer greater than 1) slave devices are connected to a master device, and serial numbers are 1, 2, . . . , N. A packet needs to be diverted to 5 slave devices whose serial numbers are 1, 2, 5, 8, and N; preset diversion order is 5, 2, 8, N, 1, the total number of bits of a multi-diversion identifier field is also N, and one slave device corresponds to one bit. Therefore, in this case, at the time of identifying, according to the preset diversion order, all slave devices to which the packet needs to be diverted in a multi-diversion identifier field of an MPLS header, starting from a first bit on the left (or the right) in the N bits of the multi-diversion identifier field, set that the first bit corresponds to a slave device 5, a second bit corresponds to a slave device 2, a third bit corresponds to a slave device 8, a fourth bit corresponds to a slave device N, a fifth bit corresponds to a slave device 1, and the remaining (N−5) bits may correspond to the remaining (N−5) slave devices randomly. At the time of searching, the searching may start from a left end (or a right end) of the multi-diversion identifier field.

It should be noted that the MPLS header carried in the packet may have multiple layers, and the number of layers of the MPLS header may be determined according to an information amount that actually needs to be carried. For example, when the number of slave devices connected to the master device is large, the number of bits of the multi-diversion identifier field is also large correspondingly; when the total number of links in the master device is large, the number of bits of the link number field is also large correspondingly. In this case, if one MPLS header is not enough for carrying such information, two or more MPLS headers may be used to carry the multi-diversion information (including the multi-diversion identifier field and the link number field). Generally, an existing standard protocol may support 7 layers of MPLS header at most.

103: Receive a packet sent by the first slave device, where the packet includes the MPLS header that carries the multi-diversion information, which may specifically be as follows:

After receiving the packet sent by the master device, the first slave device processes a data part of the packet without changing the MPLS header, and then returns the processed packet to the master device.

104: Determine, according to the multi-diversion information such as the multi-diversion identifier field, a second slave device to which the packet needs to be diverted (that is, a next slave device to which the packet needs to be diverted). For example, the second slave device to which the packet needs to be diverted may specifically be determined according to the multi-diversion identifier field in the MPLS header, which is as follows:

Start searching from one end of the multi-diversion identifier field of the MPLS header according to the preset diversion order; when the first first value is found through searching, set the bit where the first first value found through searching is located to a second value (which is used to indicate that the packet has been diverted to a corresponding slave device); and then continue searching for a next first value; if the next first value is found through searching, determine a slave device corresponding to a bit where the next first value is located as the second slave device. Afterward, the packet that includes the MPLS header may be sent to the second slave device.

In addition, the method for diverting the packet multiple times may further include: if no next first value is found through searching subsequently, considering that the packet has been diverted to all slave devices to which the packet needs to be diverted, and therefore, determining the link indicated by the link number field; and after removing the MPLS header in the packet, sending, over the determined link, a packet in which the MPLS header has been removed.

The second value may be set according to the policy of the operator, but the second value should not be the same as the first value. For example, when the first value is set to "1", the second value may be set to "0"; when the first value is set to "0", the second value may be set to "1", and so on. The following uses examples to describe the two manners in step 102 accordingly.

(1) If Manner 1 in step 102 is applied to identify the multi-diversion identifier field, step 104 may specifically be:

resetting the first bit set to 1 in the multi-diversion identifier field to 0 according to the preset diversion order;

searching for a next bit set to 1 in the multi-diversion identifier field according to the preset diversion order;

if the next bit set to 1 is found through searching, determining a slave device corresponding to the next bit set to 1 as the second slave device to which the packet needs to be diverted (that is, the next slave device to which the packet needs to be diverted), and performing step 105; and if no next bit set to 1 is found through searching, searching for a corresponding link in the master device according to the link number field, and sending the packet over the link found through searching, and the procedure ends.

(2) If Manner 2 in step 102 is applied to identify the multi-diversion identifier field, step 104 may specifically be:

setting the first bit set to 0 in the multi-diversion identifier field to 1 according to the preset diversion order;

searching for a next bit set to 0 in the multi-diversion identifier field according to the preset diversion order;

if the next bit set to 0 is found through searching, determining a slave device corresponding to the next bit set to 1 as the second slave device to which the packet needs to be diverted (that is, the next slave device to which the packet needs to be diverted), and performing step 105; and if no next bit set to 0 is found through searching, searching for a corresponding link in the master device according to the link number field, and after removing the MPLS header in the packet, sending, over the link found through searching, the packet in which the MPLS header has been removed, and the procedure ends.

105: Send the packet to the second slave device, and return to step 103.

It may be known from the foregoing that, in this embodiment, the MPLS header carries the multi-diversion information to implement that the packet is diverted between network devices multiple times. Relative to an existing Vlan header, the MPLS header may carry more information, and the existing standard protocol may also support 7 layers of MPLS header at most. Therefore, compared with an existing solution, the solution is more flexible, more convenient and more extensible, and more multi-diversion information may be carried on the basis of compliance with the existing standard protocol.

Embodiment 2

According to the method described in Embodiment 1, the following gives detailed description through examples.

First, a corresponding serial number is preset for each slave device in a master device, where the serial number is called a slave device serial number. Second, diversion order needs to be specified. For example, a packet is diverted according to ascending order of the slave device serial number, or descending order of the slave device serial number, or random order of the serial number. Further, a corresponding bit also needs to be set for each slave device in a multi-diversion identifier field in an MPLS header according to the preset diversion order, that is, specify which bit in the multi-diversion identifier field corresponds to each slave device.

In addition, the master device includes multiple links, and each link includes an uplink and a downlink. Therefore, a link used for receiving an original packet also needs to be specified in the MPLS header, that is, specify a link over which the original packet enters the master device, and specify whether a packet after completion of diversion multiple times is sent through an uplink port or a downlink port of the link. Therefore, a link number field may be defined in the MPLS header, and is used to indicate the link which is for receiving the original packet and in the master device.

For a format of the MPLS header, reference may be made to FIG. 1c. Fields in the MPLS header are defined as follows:

(1) Multi-Diversion Identifier Field:

This field is mainly used to indicate how to perform diversion multiple times. Each slave device corresponds to one bit in the multi-diversion identifier field. A bit corresponding to a slave device to which the packet needs to be diverted is set to 1. In this way, slave devices to which the packet is to be diverted may be indicated.

Certainly, the bit corresponding to the slave device to which the packet needs to be diverted may be set to another value, such as 0. For ease of description, in this embodiment of the present invention, that the bit corresponding to the slave device to which the packet needs to be diverted is set to 1 is taken as an example for description. It should be understood that, if the bit corresponding to the slave device to which the packet needs to be diverted is set to the another value, an implementation method is similar, and is not repeatedly described here.

(2) Link Number Field:

This field is mainly used to indicate the link which is for receiving the original packet and in the master device, that is, indicates which link of the master device the original packet enters over, because the packet after diversion needs to be sent from an egress port corresponding to an ingress port of the link for receiving the packet. After completion of the diversion, the master device determines, according to the link number field, a link port from which the packet is to be sent.

(3) CoS Field:
This field is mainly used to indicate a type of a service.
(4) S Field:
This field is mainly used to indicate whether a label arrives at the bottom of a label stack currently. Generally, 1 indicates yes, and 0 indicates no.
(5) TTL Field:
This field is mainly used to indicate time-to-live of the packet.

The multi-diversion identifier field and the link number field are multi-diversion information.

When the packet is diverted from the master device to a slave device, and is diverted from the slave device back to the master device, starting from a left side (or a right side, according to pre-design) in the multi-diversion identifier field, the master device resets a first bit set to 1 to 0 according to the diversion order of the slave devices, and then searches for a next bit set to 1 in the multi-diversion identifier field according to the diversion order. If the next bit set to 1 is found through searching, the master device diverts the packet to a slave device corresponding to the next bit set to 1. If no bit set to 1 is found in the multi-diversion identifier field, the master device searches for a corresponding link in the master device according to the link number field in the MPLS header, and sends the packet over the link.

The following gives description through examples.

(1) Background

Figure 2A:
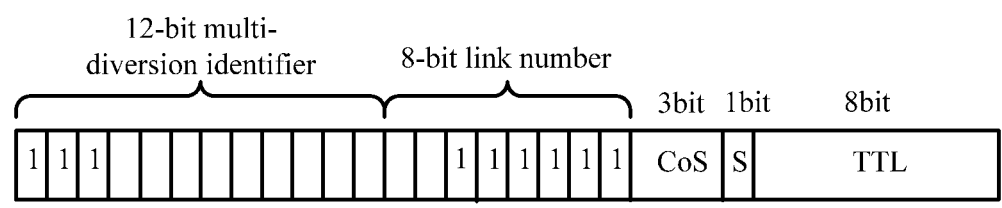
FIG. 2a is a schematic structural diagram of an MPLS header according to Embodiment 2 of the present invention.

A master device may be connected to 12 slave devices whose serial numbers are 1, 2, 3, . . . , 12 in the master device; the master device has 200 links, which are a link 1, a link 2, . . . , a link 63, . . . , and a link 200; therefore, in this case, a structure of an MPLS header may be shown in FIG. 2a. In the MPLS header, a multi-diversion identifier field occupies 12 bits, each bit corresponds to one slave device. For example, it may be set that a slave device 1 corresponds to a $31^{st}$ bit in the MPLS header, a slave device 2 corresponds to a $30^{th}$ bit in the MPLS header, a slave device 3 corresponds to a $29^{th}$ bit in the MPLS header, a slave device 4 corresponds to a $28^{th}$ bit in the MPLS header, and on the rest may be deduced by analogy. If slave devices to which the packet needs to be diverted are the slave device 1 and the slave device 2, the multi-diversion identifier field may specifically be 110000000000; for another example, if slave devices to which the packet needs to be diverted are the slave device 1, the slave device 3, the slave device 4, and the slave device 8, the multi-diversion identifier field may specifically be 101100010000, and so on. The link number field may occupy 8 bits for recording a link number of the link for receiving the original packet. For example, if the link number of the link for receiving the original packet is 63, "00111111" may be recorded in the link number field, where "00111111" is a binary number corresponding to "63".

(2) Current Scenario

Figure 2B:
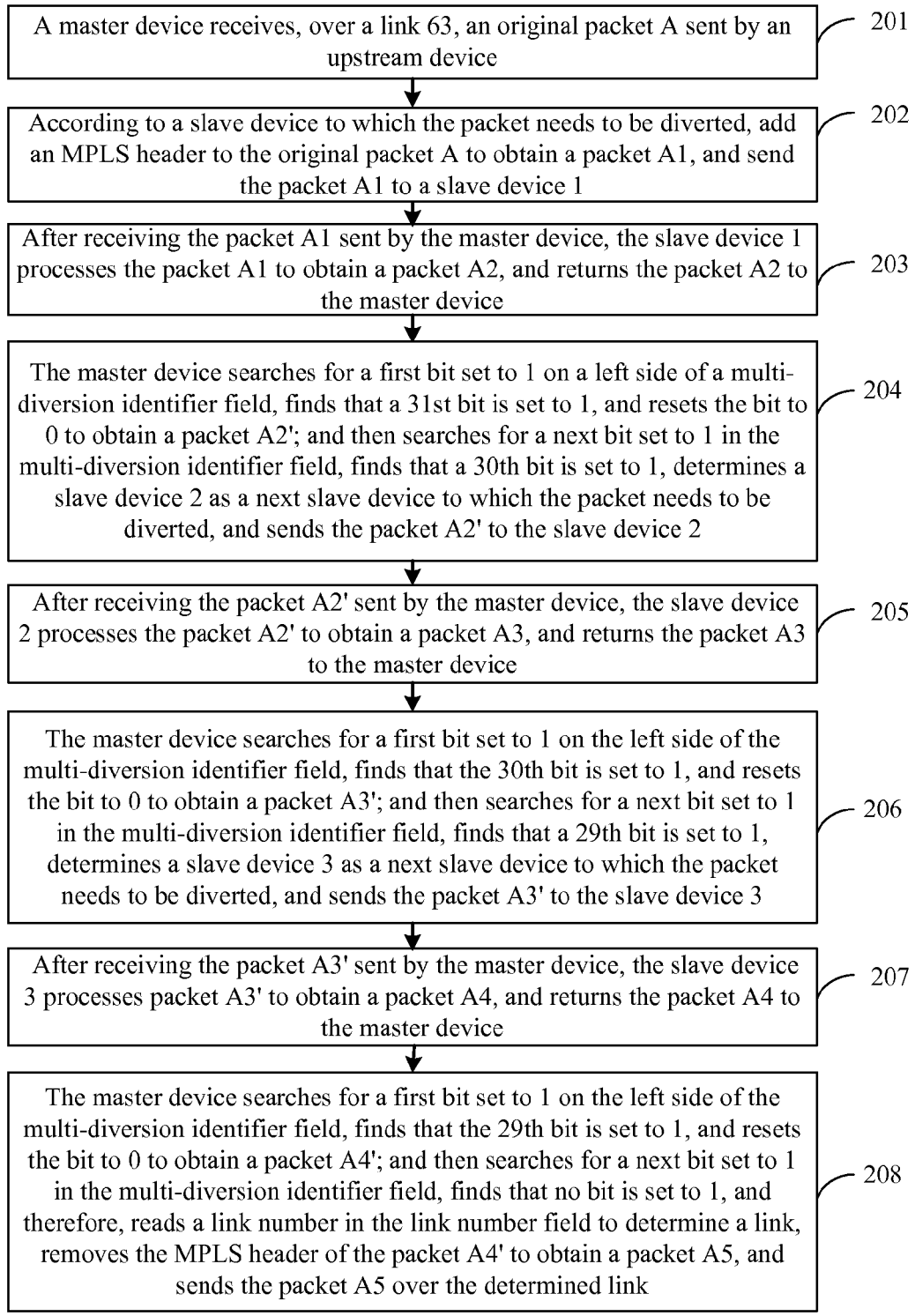
FIG. 2b is a flowchart of a method for diverting a packet multiple times according to Embodiment 2 of the present invention.
Figure 2C:
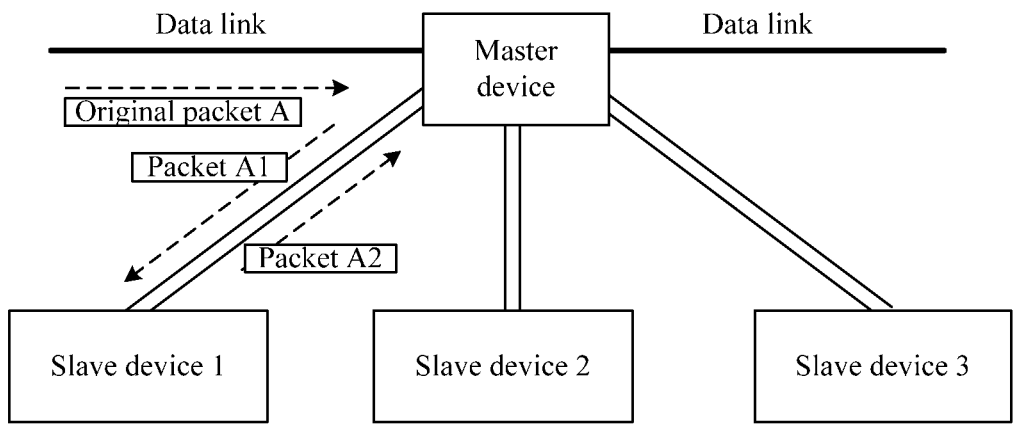
FIG. 2c is a schematic diagram of diverting a packet to a slave device 1 according to Embodiment 2 of the present invention.
Figure 2D:
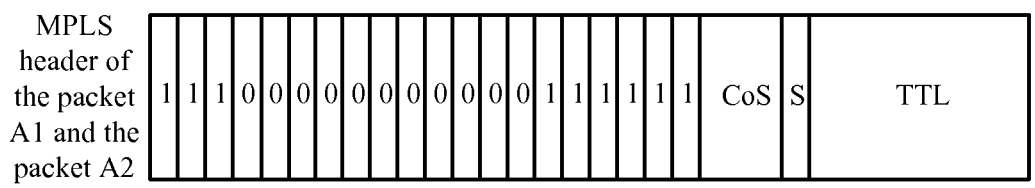
FIG. 2d is a schematic diagram of the packet diverted to the slave device 1 according to Embodiment 2 of the present invention.

If a current original packet enters the master device through the link 63 and needs to be diverted to the slave device 1, the slave device 2, and the slave device 3, and the diversion order is the ascending order of the slave device serial number, that is, the packet is diverted to the slave device 1, the slave device 2, and the slave device 3 in turn, which specifically is: the master device->the slave device 1->the master device->the slave device 2->the master device->the slave device 3->the master device. The slave device 1 corresponds to the $31^{st}$ bit in the MPLS header, the slave device 2 corresponds to the $30^{th}$ bit in the MPLS header, the slave device 3 corresponds to the $29^{th}$ bit in the MPLS header. Referring to FIG. 2b, a specific procedure may be as follows:

201: A master device receives, over a link 63, an original packet A sent by an uupstream device, referring to FIG. 2c and FIG. 2d.

202: When the original packet A enters the master device through the link 63, the master device determines that the original packet A needs to be diverted multiple times, therefore, according to slave devices to which the packet needs to be diverted, and diversion order (which is ascending order of a slave device serial number in this example), adds an MPLS header to the original packet A to obtain a packet A1, and sends the packet A1 to a slave device 1.

$29^{th}$ to $31^{st}$ bits in the MPLS header are all 1s, which indicates slave devices to which the packet needs to be diverted include the slave device 1, a slave device 2, and a slave device 3, that is, a multi-diversion identifier field in the MPLS header is 111000000000; a link number field is 00111111, which indicates that the original packet A enters the master device from the link 63, and after diversion multiple times, a processed packet is sent from a port with the link number 63 in the master device. For details, reference may be made to FIG. 2d.

203: After receiving the packet A1 sent by the master device, the slave device 1 processes the packet A1 to obtain a packet A2. The packet A2 carries a same MPLS header as that of the packet A1, that is, the slave device 1 does not change the MPLS header of the packet A1.

The slave device 1 returns the packet A2 to the master device.

Figure 2E:
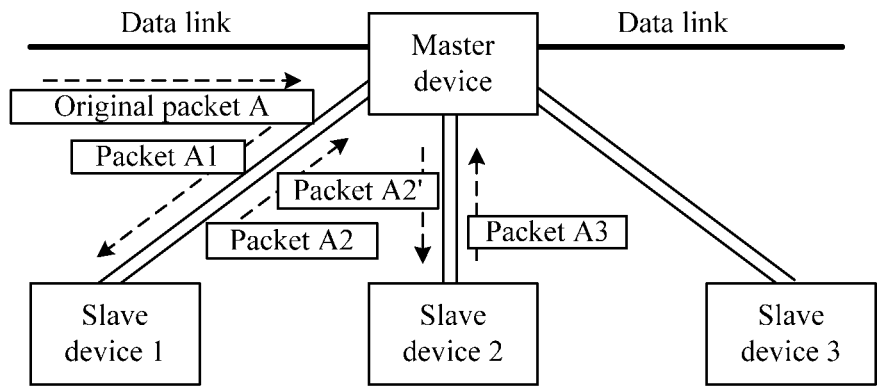
FIG. 2e is a schematic diagram of diverting a packet to a slave device 2 according to Embodiment 2 of the present invention.
Figure 2F:
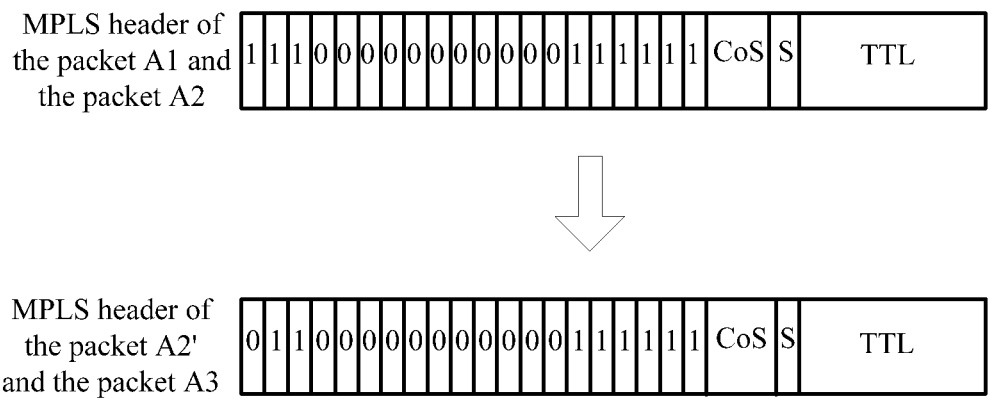
FIG. 2f is a schematic diagram of the packet diverted to the slave device 2 according to Embodiment 2 of the present invention.

204: After receiving the packet A2 sent by the slave device 1, the master device searches for a first bit set to 1 on a left side of the multi-diversion identifier field of the MPLS header, finds that the $31^{st}$ bit is set to 1, and therefore, resets the bit to 0 to obtain a packet A2'. That is, in this case, the multi-diversion identifier field is specifically 011000000000, and the link number field in the MPLS header remains unchanged, that is, 00111111, referring to FIG. 2e and FIG. 2f.

Afterward, the master device searches for a next bit set to 1 in the multi-diversion identifier field, and finds that the $30^{th}$ bit is set to 1. Therefore, the master device determines that the slave device 2 is a next slave device to which the packet needs to be diverted, and sends the packet A2' to the slave device 2.

205: After receiving the packet A2' sent by the master device, the slave device 2 processes the packet A2' to obtain a packet A3. The packet A3 carries a same MPLS header as that of the packet A2', that is, the slave device 2 does not change the MPLS header of the packet A2'.

The slave device 2 returns the packet A3 to the master device.

Figure 2G:
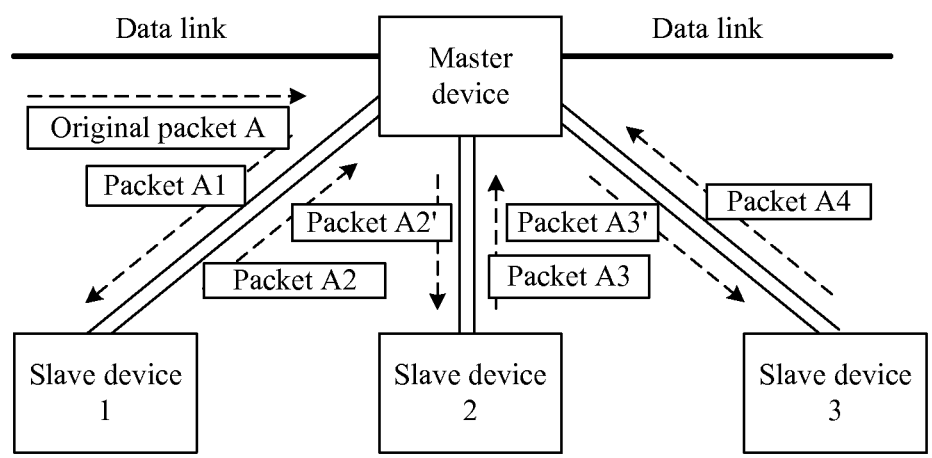
FIG. 2g is a schematic diagram of diverting a packet to a slave device 3 according to Embodiment 2 of the present invention.
Figure 2H:
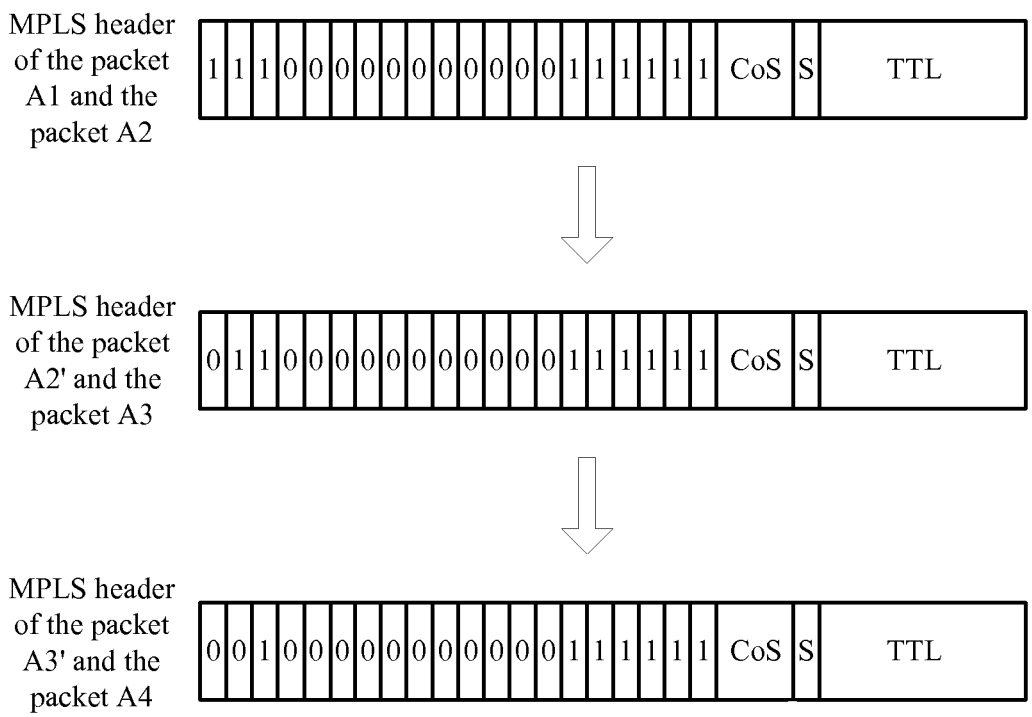
FIG. 2h is a schematic diagram of the packet diverted to the slave device 3 according to Embodiment 2 of the present invention.

206: After receiving the packet A3 sent by the slave device 2, the master device searches for a first bit set to 1 on the left side of the multi-diversion identifier field of the MPLS header, finds that the $30^{th}$ bit is set to 1, and therefore, resets the bit to 0 to obtain a packet A3'. That is, in this case, the multi-diversion identifier field is 001000000000, and the link number field in the MPLS header remains unchanged, that is, 00111111, referring to FIG. 2g and FIG. 2h.

Afterward, the master device searches for a next bit set to 1 in the multi-diversion identifier field, and finds that the $29^{th}$ bit is set to 1. Therefore, the master device determines that the slave device 3 is a next slave device to which the packet needs to be diverted, and sends the packet A3' to the slave device 3.

207: After receiving the packet A3' sent by the master device, the slave device 3 processes the packet A3' to obtain a packet A4. The packet A4 carries a same MPLS header as that of the packet A3', that is, the slave device 3 does not change the MPLS header of the packet A3'.

The slave device 3 returns the packet A4 to the master device.

208: After receiving the packet A4 sent by the slave device 3, the master device searches for a first bit set to 1 on the left side of the multi-diversion identifier field of the MPLS header, finds that the $29^{th}$ bit is set to 1, and therefore, resets the bit to 0 to obtain a packet A4'. That is, in this case, the multi-diversion identifier field is 000000000000, and the link number field in the MPLS header remains unchanged, that is, 00111111, referring to FIG. 2i and FIG. 2j.

Figure 2I:
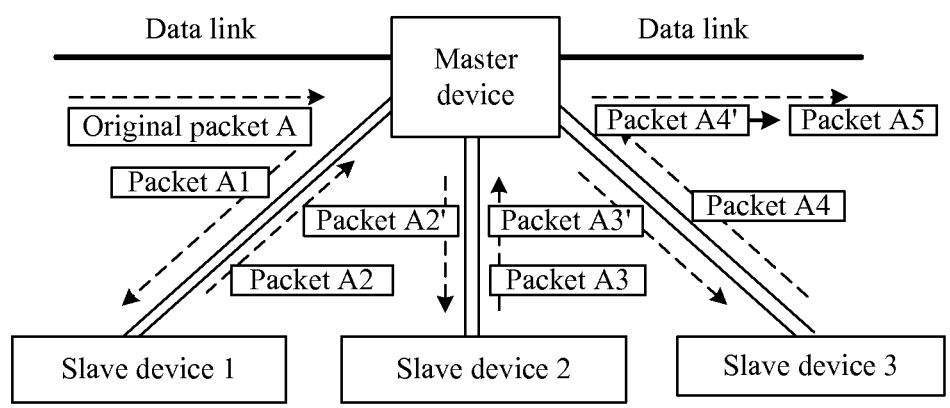
FIG. 2i is a schematic diagram of sending a packet over a link according to Embodiment 2 of the present invention.
Figure 2J:
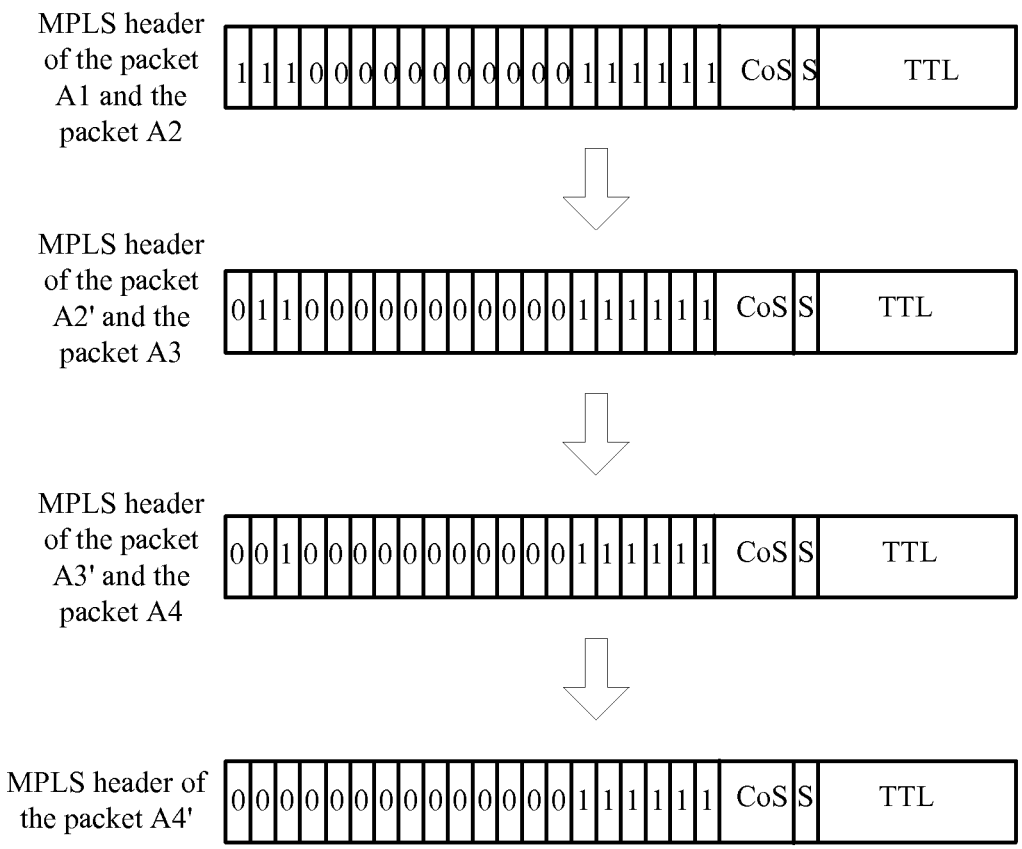
FIG. 2j is a schematic diagram of the packet sent over the link according to Embodiment 2 of the present invention.

The master device continues searching for a next bit set to 1 in the multi-diversion identifier field, and finds that no bit is set to 1, and therefore, reads the link number "00111111" in the link number field, determines that a link corresponding to the link number is the link 63, removes the MPLS header of the packet A4' to obtain a packet A5, and sends the packet A5 from the port of the link 63 in the master device, for example, to a downstream device of the master device, referring to FIG. 2i and FIG. 2j.

It should be noted that the foregoing only takes that the number of bits of the multi-diversion identifier field is 12 and the number of bits of the link number field is 8 as an example for description. It should be understood that, their number of bits may also be adjusted according to actual application requirements. For example, if the master device is connected to 14 slave devices and has 60 links, the number of bits of the multi-diversion identifier field may be adjusted to 14, and the number of bits of the link number field may be adjusted to 6. If one layer of MPLS header is not enough for carrying the multi-diversion information, the number of layers of the MPLS header may also be increased according to an information amount of the multi-diversion information. Generally, an existing standard protocol may support 7 layers of MPLS header at most.

It may be known from the foregoing that, in this embodiment, the MPLS header carries the multi-diversion information to implement that the packet is diverted between network devices multiple times. Relative to an existing Vlan header, the MPLS header may carry more information, and the existing standard protocol may also support 7 layers of MPLS header at most. Therefore, compared with an existing solution, the solution is more flexible, more convenient and more extensible, and more multi-diversion information may be carried on the basis of compliance with the existing standard protocol.

In addition, it should be noted that if the slave devices are connected to the master device through a switch, one layer of Vlan header may be added for implementation on the original basis, which is not described in detail here.

Embodiment 3

Figure 3A:
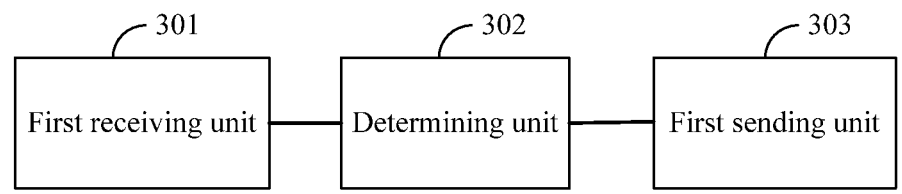
FIG. 3a is a schematic structural diagram of a network device according to an embodiment of the present invention.

To better implement the foregoing method, this embodiment of the present invention further provides a network device, which may serve as a master device in this embodiment of the present invention. As shown in FIG. 3a, the network device includes a first receiving unit 301, a determining unit 302, and a sending unit 303.

The first receiving unit 301 is configured to receive a packet sent by a first slave device, where the packet includes an MPLS header that carries multi-diversion information, the multi-diversion information includes a multi-diversion identifier field, and the multi-diversion identifier field is used to indicate a slave device to which the packet needs to be diverted;

The determining unit 302 is configured to determine, according to the multi-diversion identifier field, a second slave device to which the packet needs to be diverted; and The first sending unit 303 is configured to send the packet to the second slave device determined by the determining unit 302.

Figure 3B:
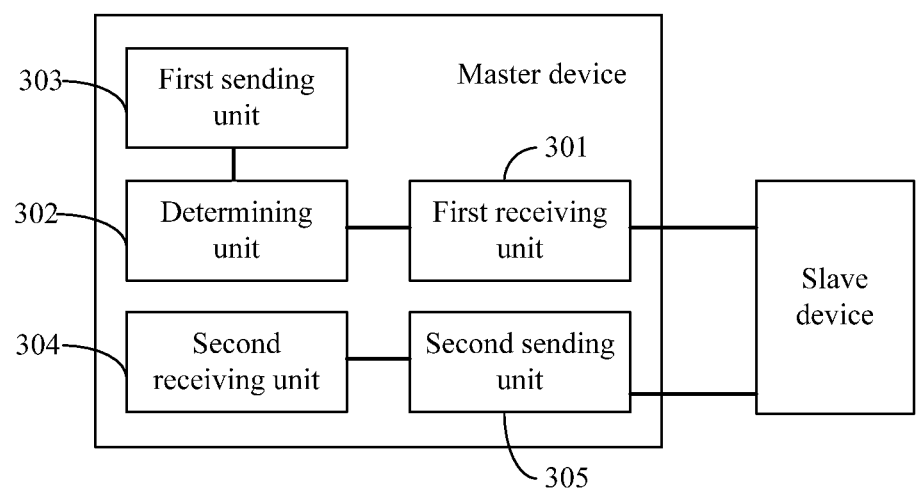
FIG. 3b is another schematic structural diagram of a network device according to an embodiment of the present invention.

As shown in FIG. 3b, the network device may further include a second receiving unit 304 and a second sending unit 305. It should be noted that FIG. 3b also illustrates a slave device for clarity of expression.

The second receiving unit 304 is configured to receive an original packet sent by an uupstream device before the first receiving unit 301 receives the packet sent by the first slave device.

The second sending unit 305 is configured to send the packet to the first slave device after an MPLS header that carries multi-diversion information is added to the original packet received by the second receiving unit 304.

The multi-diversion information further includes a link number field. The link number field is used to indicate a link which is for receiving the original packet and in the master device. The number M of bits (bit) of the multi-diversion identifier field and the number N of bits of the link number field may be set according to actual application requirements. The MPLS header may further include a CoS field, an S field, and a TTL field. Reference may be made to the foregoing method embodiments for details, which are not repeatedly described here.

Therefore, in this case, the second sending unit 305 may include a first identifier subunit, a second identifier subunit, and a sending subunit.

The first identifier subunit is configured to add an identifier of the link for receiving the original packet by the second receiving unit 304 to the link number field of the MPLS header, where a link number may be used as the identifier of the link.

The second identifier subunit is configured to identify, according to preset diversion order, all slave devices to which the packet needs to be diverted in the multi-diversion identifier field of the MPLS header, where the preset diversion order is used to indicate order of all the slave devices to which the packet needs to be diverted. Specifically, the second identifier subunit determines at least one bit corresponding to each slave device according to the preset diversion order, and sets the at least one bit corresponding to each slave device to which the packet needs to be diverted to a first value.

The sending subunit is configured to divert the packet with the MPLS header to the first slave device according to the preset diversion order after the first identifier subunit and the second identifier subunit complete execution.

The determining unit 302 is specifically configured to search, according to the preset diversion order, the multi-diversion identifier field for a second slave device (that is, a next slave device) to which the packet needs to be diverted. Specifically, after the first receiving unit 301 receives the packet sent by the first slave device, the determining unit 302 determines, according to the preset diversion order and the multi-diversion identifier field in the MPLS header of the received packet, the next slave device to which the packet needs to be diverted.

It may be set that each slave device attached to the master device corresponds to at least one bit in the multi-diversion identifier field, and it is set that when the at least one bit is the first value, it indicates that the packet needs to be diverted to a corresponding slave device.

Therefore, the sending subunit is specifically configured to start searching from one end of the multi-diversion identifier field according to the preset diversion order; and when a first first value is found through searching, divert the packet with the MPLS header to the first slave device, where the first slave device corresponds to a bit where the first first value is located.

The determining unit 302 is specifically configured to start searching from one end of the multi-diversion identifier field according to the preset diversion order; when a first first value is found through searching, set a bit where the first first value found through searching is located to a second value; and then continue searching for a next first value; and if the next first value is found through searching, determine a slave device corresponding to a bit where the next first value is located as the second slave device.

The first sending unit 303 is further configured to, when the determining unit 302 finds no next first value through searching, determine a link indicated by the link number field, remove the MPLS header in the packet, and send, over the determined link, a packet in which the MPLS header has been removed.

The first value and the second value may be preset according to a policy of an operator, but the first value should not be the same as the second value. For example, in a case that each slave device corresponds to 1 bit in the multi-diversion identifier field, the first value may be set to "1", and in this case, the second value may be set to "0"; when the first value is set to "0", the second value may be set to "1"; in a case that each slave device corresponds to 2 bits in the multi-diversion identifier field, the first value may be set to "11", and in this case, the second value may be set to "00"; when the first value is set to "10", the second value may be set to "01", and the rest may be deduced by analogy. For example, in the case that each slave device corresponds to 1 bit in the multi-diversion identifier field, the setting may be as follows:

Manner 1: Set a corresponding bit for each slave device in the multi-diversion identifier field according to the preset diversion order (that is, specify which slave device corresponds to which bit in the multi-diversion identifier field); and specify that when a bit is set to 1, it indicates that the packet needs to be diverted to a corresponding slave device.

Manner 2: Set a corresponding bit for each slave device in the multi-diversion identifier field according to the preset diversion order; and specify that when a bit is set to 0, it indicates that the packet needs to be diverted to a corresponding slave device.

(1) If Manner 1 is Applied, the second identifier subunit is specifically configured to set bits corresponding to all the slave devices to which the packet needs to be diverted in a current device cluster to 1s.

In this case, the determining unit 302 may include a first resetting subunit, a first searching subunit, and a first determining subunit.

The first resetting subunit is configured to reset a first bit set to 1 in the multi-diversion identifier field to 0 according to the preset diversion order.

The first searching subunit is configured to search for a next bit set to 1 in the multi-diversion identifier field according to the preset diversion order.

The first determining subunit is configured to, when the first searching subunit finds the next bit set to 1 through searching, determine a slave device corresponding to the next bit set to 1 as the second slave device to which the packet needs to be diverted (that is, the next slave device to which the packet needs to be diverted).

Therefore, the first sending unit 303 is further configured to, when the first searching subunit finds no next bit set to 1 through searching, search for a corresponding link in the master device according to the link number field, remove the MPLS header in the packet, and send, over the link found through searching, the packet in which the MPLS header has been removed.

(2) If Manner 2 is Applied, the second identifier subunit is specifically configured to set bits corresponding to all the slave devices to which the packet needs to be diverted in a current device cluster to 0s.

In this case, the determining unit 302 may include a second resetting subunit, a second searching subunit, and a second determining subunit.

The second resetting subunit is configured to set a first bit set to 0 in the multi-diversion identifier field to 1 according to the preset diversion order.

The second searching subunit is configured to search for a next bit set to 0 in the multi-diversion identifier field according to the preset diversion order.

The second determining subunit is configured to, when the second searching subunit finds the next bit set to 0 through searching, determine a slave device corresponding to the next bit set to 0 as the second slave device to which the packet needs to be diverted (that is, the next slave device to which the packet needs to be diverted).

Therefore, the first sending unit 303 is further configured to, when the second searching subunit finds no next bit set to 0 through searching, search for a corresponding link in the master device according to the link number field, remove the MPLS header in the packet, and send, over the link found through searching, the packet in which the MPLS header has been removed.

For specific implementation of the foregoing units, reference may be made to the foregoing method embodiments, and details are not repeatedly described here.

During specific implementation, the foregoing units may work as independent entities, and may also be combined randomly into one or several entities.

It may be known from the foregoing that, the second sending unit 305 of the network device in this embodiment may add the MPLS header that carries the multi-diversion information to the original packet. Therefore, after the packet returned by the slave device is received subsequently, the determining unit 302 may obtain the multi-diversion information by parsing the MPLS header, so as to determine the next slave device to which the packet needs to be diverted, thereby implementing that the packet is diverted between network devices multiple times. Relative to an existing Vlan header, the MPLS header may carry more information, and an existing standard protocol may also support 7 layers of MPLS header at most. Therefore, compared with an existing solution, the solution is more flexible, more convenient and more extensible, and more multi-diversion information may be carried on the basis of compliance with the existing standard protocol.

Embodiment 4

Correspondingly, this embodiment of the present invention further provides a communication system (reference may be made to FIG. 1 for one instance). The communication system may serve as a device cluster, and includes a master device and at least one slave device attached to the master device, where the master device may be the network device in the foregoing Embodiment 3.

The master device is configured to receive a packet sent by the slave device, where the packet includes an MPLS header that carries multi-diversion information, the multi-diversion information includes a multi-diversion identifier field, and the multi-diversion identifier field is used to indicate a slave device to which the packet needs to be diverted;

according to the multi-diversion identifier field, determine a next slave device to which the packet needs to be diverted; and send the packet to the next slave device.

The slave device is configured to receive a packet sent by the master device, and send the packet to the master device, where the packet includes an MPLS header that carries multi-diversion information.

Details are as follows:

A first slave device is configured to send a packet to a master device, where the packet includes an MPLS header that carries multi-diversion information, the multi-diversion information includes a multi-diversion identifier field, and the multi-diversion identifier field is used to indicate a slave device to which the packet needs to be diverted.

The master device is configured to receive the packet sent by the first slave device; according to the multi-diversion identifier field carried in the packet, determine a second slave device to which the packet needs to be diverted; and send the packet to the second slave device.

The second slave device is configured to receive the packet sent by the master device.

The master device is further configured to receive an original packet sent by an uupstream device, add an MPLS header that carries multi-diversion information to the original packet, and send the packet to the first slave device.

The MPLS header may include not only the multi-diversion identifier field used to indicate the slave device to which the packet needs to be diverted, but also a link number field. The link number field is used to indicate a link which is for receiving the original packet and in the master device. The number M of bits of the multi-diversion identifier field and the number N of bits of the link number field may be set according to actual application requirements. The MPLS header may further include a CoS field, an S field, and a TTL field. Reference may be made to the foregoing method embodiments for details, which are not repeatedly described here.

In this case, the master device may specifically be configured to add an identifier of the link for receiving the original packet to the link number field of the MPLS header, and identify all slave devices to which the packet needs to be diverted in the multi-diversion identifier field according to preset diversion order. Specifically, the identifier of the link may be an identifier such as a link number.

Further, the master device is specifically configured to determine, according to the multi-diversion identifier field, the second slave device to which the packet needs to be diverted. For example, it may be set that each slave device attached to the master device corresponds to at least one bit in the multi-diversion identifier field, and it is set that when the at least one bit is a first value, it indicates that the packet needs to be diverted to a corresponding slave device. For example, when each slave device corresponds to one bit in the multi-diversion identifier field, it may be specified that when a bit is set to 1 or 0, it indicates that the packet needs to be diverted to a corresponding slave device.

If it is specified that when the bit is set to 1, it indicates that the packet needs to be diverted to the corresponding slave device, the master device is specifically configured to reset a first bit set to 1 in the multi-diversion identifier field to 0 according to the preset diversion order, and then search for a next bit set to 1 in the multi-diversion identifier field according to the preset diversion order; and if the next bit set to 1 is found through searching, determine a slave device corresponding to the next bit set to 1 as the second slave device to which the packet needs to be diverted.

In this case, the master device is further configured to, if no next bit set to 1 is found through searching, search for a corresponding link in the master device according to the link number field, remove the MPLS header in the packet, and send, over the link found through searching, a packet in which the MPLS header has been removed.

Alternatively, if it is specified that when the bit is set to 0, it indicates that the packet needs to be diverted to the corresponding slave device, the master device is specifically configured to set a first bit set to 0 in the multi-diversion identifier field to 1 according to the preset diversion order, and then search for a next bit set to 0 in the multi-diversion identifier field according to the preset diversion order; and if the next bit set to 0 is found through searching, determine a slave device corresponding to the next bit set to 0 as the second slave device to which the packet needs to be diverted.

In this case, the master device is further configured to, if no next bit set to 0 is found through searching, search for a corresponding link in the master device according to the link number field, remove the MPLS header in the packet, and send, over the link found through searching, a packet in which the MPLS header has been removed.

For specific implementation of the foregoing devices, reference may be made to the foregoing embodiments, and details are not repeatedly described here.

It may be known from the foregoing that, in the communication system in this embodiment, the master device adds the MPLS header to the received original packet. The MPLS header carries the multi-diversion information to implement that the packet is diverted between network devices multiple times. Relative to an existing Vlan header, the MPLS header may carry more information, and an existing standard protocol may also support 7 layers of MPLS header at most. Therefore, compared with an existing solution, the solution is more flexible, more convenient and more extensible, and more multi-diversion information may be carried on the basis of compliance with the existing standard protocol.

It should be noted that persons of ordinary skill in the art may understand that all or part of processes in the methods of the foregoing embodiments may be implemented by a computer program instructing relevant hardware. The program may be stored in a computer readable storage medium, and when the program is executed, the processes of the embodiments of the foregoing methods may be included. The storage medium may be a magnetic disk, an optical disk, a read-only memory (Read-Only Memory, ROM), a random access memory (Random Access Memory, RAM), and so on.

Persons of ordinary skill in the art should understand that all or part of the steps of the methods in the foregoing embodiments may be implemented by a program instructing relevant hardware. The program may be stored in a computer readable storage medium, and the storage medium may include a read-only memory, a random access memory, a magnetic disk or an optical disk, and so on.

The foregoing describes a method, an apparatus, and a system for diverting packet multiple times according to the embodiments of the present invention in detail. The principles and implementation manners of the present invention are described by applying specific embodiments, and the description of the foregoing embodiments is merely used to help understanding of the methods and its core ideas of the present invention. Meanwhile, those of ordinary skill in the art may make variations to the specific implementation manners and applications scopes according to the ideas of the present invention. To sum up, the content of the specification shall not be construed as a limitation to the present invention.

What is claimed is:

1. A method performed by a network entity functioning as a master device and communicating with multiple slave devices on a network for diverting a packet multiple times, comprising:
   receiving an original packet sent by an upstream device;
   adding a multi-protocol label switching (MPLS) header that carries multi-diversion information to the original packet to generate a modified packet;
   sending the modified packet with the MPLS header to a first slave device;
   receiving a processed packet sent by the first slave device, wherein the processed packet comprises the MPLS header that carries multi-diversion information, the multi-diversion information comprises a multi-diversion identifier field, and the multi-diversion identifier field contains data indicating that there is a second slave device to which the processed packet needs to be diverted;
   determining, according to the multi-diversion identifier field, the second slave device to which the processed packet needs to be diverted; and
   sending the processed packet to the second slave device.

2. The method according to claim 1, wherein the multi-diversion information further comprises a link number field, and the link number field is used to indicate a link which is for receiving the original packet and in the master device; and the after adding an MPLS header that carries multi-diversion information to the original packet, sending the modified packet with the MPLS header to the first slave device comprises:
   adding an identifier of the link for receiving the original packet to the link number field of the MPLS header;
   identifying, according to preset diversion order, all slave devices to which the modified packet needs to be diverted in the multi-diversion identifier field of the MPLS header, wherein the preset diversion order is used to indicate order of all the slave devices to which the modified packet needs to be diverted; and
   diverting the modified packet with the MPLS header to the first slave device according to the preset diversion order.

3. The method according to claim 2, wherein each slave device attached to the master device corresponds to at least one bit in the multi-diversion identifier field, and when the at least one bit is set to a first value, it indicates that the modified packet needs to be diverted to a corresponding slave device;
   the identifying, according to preset diversion order, all slave devices to which the modified packet needs to be diverted in the multi-diversion identifier field of the MPLS header comprises: determining at least one bit corresponding to each slave device according to the preset diversion order, and setting the at least one bit corresponding to each slave device to which the modified packet needs to be diverted to the first value;
   the diverting the modified packet with the MPLS header to the first slave device according to the preset diversion order comprises: starting searching from one end of the multi-diversion identifier field according to the preset diversion order; and when a first first value is found through searching, diverting the modified packet with the MPLS header to the first slave device, wherein the first slave device corresponds to a bit where the first first value is located.

4. The method according to claim 1, wherein the multi-diversion information further comprises a link number field, the link number field is used to indicate a link which is for receiving the original packet and in the master device, each slave device attached to the master device corresponds to at least one bit in the multi-diversion identifier field, and when the at least one bit is set to a first value, it indicates that the modified packet needs to be diverted to a corresponding slave device; and the determining, according to the multi-diversion identifier field, the second slave device to which the processed packet needs to be diverted comprises:
   starting searching from one end of the multi-diversion identifier field according to the preset diversion order;
   when the first first value is found through searching, setting a bit where the first first value found through searching is located to a second value; and
   continuing searching for a next first value; if the next first value is found through searching, determining a slave device corresponding to a bit where the next first value is located as the second slave device.

5. The method according to claim 4, further comprising:
   if no next first value is found through searching, determining a link indicated by the link number field, removing the MPLS header in the processed packet, and sending, over the determined link, a packet in which the MPLS header has been removed.

6. The method according to claim 2, wherein the multi-diversion information further comprises a link number field, the link number field is used to indicate a link which is for receiving the original packet and in the master device, each slave device attached to the master device corresponds to at least one bit in the multi-diversion identifier field, and when the at least one bit is set to a first value, it indicates that the modified packet needs to be diverted to a corresponding slave device; and the determining, according to the multi-diversion identifier field, the second slave device to which the processed packet needs to be diverted comprises:
   starting searching from one end of the multi-diversion identifier field according to the preset diversion order;
   when the first first value is found through searching, setting a bit where the first first value found through searching is located to a second value; and
   continuing searching for a next first value; if the next first value is found through searching, determining a slave device corresponding to a bit where the next first value is located as the second slave device.

7. The method according to claim 6, further comprising:
   if no next first value is found through searching, determining a link indicated by the link number field, removing the MPLS header in the processed packet, and sending, over the determined link, a packet in which the MPLS header has been removed.

8. The method according to claim 3, wherein the multi-diversion information further comprises a link number field, the link number field is used to indicate a link which is for receiving the original packet and in the master device, each slave device attached to the master device corresponds to at least one bit in the multi-diversion identifier field, and when the at least one bit is set to a first value, it indicates that the modified packet needs to be diverted to a corresponding slave device; and the determining, according to the multi-diversion identifier field, the second slave device to which the processed packet needs to be diverted comprises:
   starting searching from one end of the multi-diversion identifier field according to the preset diversion order;

when the first first value is found through searching, setting a bit where the first first value found through searching is located to a second value; and continuing searching for a next first value; if the next first value is found through searching, determining a slave device corresponding to a bit where the next first value is located as the second slave device.

9. The method according to claim 8, further comprising:

if no next first value is found through searching, determining a link indicated by the link number field, removing the MPLS header in the processed packet, and sending, over the determined link, a packet in which the MPLS header has been removed.

10. A network device, comprising:

a second receiving unit, configured to receive an original packet sent by an upstream device before a first receiving unit receives a processed packet sent by a first slave device; and a second sending unit, configured to send a modified packet to the first slave device after an MPLS header that carries multi-diversion information is added to the original packet to generate the modified packet;

the first receiving unit, configured to receive the processed packet sent by the first slave device, wherein the processed packet comprises the MPLS header that carries multi-diversion information, the multi-diversion information comprises a multi-diversion identifier field, and the multi-diversion identifier field contains data indicating that there is a second slave device to which the processed packet needs to be diverted;

a determining unit, configured to determine, according to the multi-diversion identifier field, the second slave device to which the processed packet needs to be diverted; and a first sending unit, configured to send the processed packet to the second slave device.

11. The network device according to claim 10, wherein the MPLS header further comprises a link number field, the link number field is used to indicate a link which is for receiving the original packet and in the master device, each slave device attached to the master device corresponds to at least one bit in the multi-diversion identifier field, and when the at least one bit is a first value, it indicates that the modified packet needs to be diverted to a corresponding slave device; and therefore, the second sending unit comprises:

a first identifier subunit, configured to add an identifier of the link for receiving the original packet to the link number field of the MPLS header;

a second identifier subunit, configured to determine at least one bit corresponding to each slave device according to preset diversion order; and set at least one bit corresponding to each slave device to which the modified packet needs to be diverted to a first value, wherein the preset diversion order is used to indicate order of all slave devices to which the modified packet needs to be diverted; and a sending subunit, configured to start searching from one end of the multi-diversion identifier field according to the preset diversion order after the first identifier subunit and the second identifier subunit complete execution; and when a first first value is found through searching, divert the modified packet with the MPLS header to the first slave device, wherein the first slave device corresponds to a bit where the first first value is located.

12. The network device according to claim 10, wherein:

the determining unit is specifically configured to start searching from one end of the multi-diversion identifier field according to the preset diversion order; when the first first value is found through searching, set the bit where the first first value found through searching is located to a second value; and then continue searching for a next first value; and if the next first value is found through searching, determine a slave device corresponding to a bit where the next first value is located as the second slave device; and the first sending unit is further configured to, when the determining unit finds no next first value through searching, determine a link indicated by the link number field, remove the MPLS header in the processed packet, and send, over the determined link, a packet in which the MPLS header has been removed.

13. A communication system, comprising:

a master device; and at least two slave devices attached to the master device, wherein the master device comprises:

a second receiving unit, configured to receive an original packet sent by an upstream device before a first receiving unit receives a processed packet sent by a first slave device; and a second sending unit, configured to send a modified packet to the first slave device after an MPLS header that carries multi-diversion information is added to the original packet to generate the modified packet;

the first receiving unit, configured to receive the processed packet sent by the first slave device, wherein the processed packet comprises the MPLS header that carries multi-diversion information, the multi-diversion information comprises a multi-diversion identifier field, and the multi-diversion identifier field contains data indicating that there is a second slave device to which the processed packet needs to be diverted;

a determining unit, configured to determine, according to the multi-diversion identifier field, the second slave device to which the processed packet needs to be diverted; and a first sending unit, configured to send the processed packet to the second slave device; and the slave device is configured to receive the modified packet sent by the master device, and send the processed packet to the master device, wherein the processed packet comprises a multi-protocol label switching MPLS header that carries multi-diversion information.

14. A communication system, comprising:

a master device; and at least two slave devices attached to the master device, wherein the master device comprises:

a second receiving unit, configured to receive an original packet sent by an upstream device before a first receiving unit receives a processed packet sent by a first slave device; and a second sending unit, configured to send a modified packet to the first slave device after an MPLS header that carries multi-diversion information is added to the original packet to generate the modified packet;

the first receiving unit, configured to receive the processed packet sent by the first slave device, wherein the processed packet comprises the MPLS header that carries multi-diversion information, the multi-diversion information comprises a multi-diversion identifier field, and the multi-diversion identifier field contains data indicating that there is a second slave device to which the processed packet needs to be diverted;

a determining unit, configured to determine, according to the multi-diversion identifier field, the second slave device to which the processed packet needs to be diverted; and a first sending unit, configured to send the processed packet to the second slave device;

wherein the MPLS header further comprises a link number field, the link number field is used to indicate a link which is for receiving the original packet and in the master device, each slave device attached to the master device corresponds to at least one bit in the multi-diversion identifier field, and when the at least one bit is a first value, it indicates that the modified packet needs to be diverted to a corresponding slave device; and therefore, the second sending unit comprises:

a first identifier subunit, configured to add an identifier of the link for receiving the original packet to the link number field of the MPLS header;

a second identifier subunit, configured to determine at least one bit corresponding to each slave device according to preset diversion order; and set at least one bit corresponding to each slave device to which the modified packet needs to be diverted to a first value, wherein the preset diversion order is used to indicate order of all slave devices to which the modified packet needs to be diverted; and a sending subunit, configured to start searching from one end of the multi-diversion identifier field according to the preset diversion order after the first identifier subunit and the second identifier subunit complete execution; and when a first first value is found through searching, divert the modified packet with the MPLS header to the first slave device, wherein the first slave device corresponds to a bit where the first first value is located; and the slave device is configured to receive the modified packet sent by the master device, and send the processed packet to the master device, wherein the processed packet comprises a multi-protocol label switching MPLS header that carries multi-diversion information.

15. A communication system, comprising:
a master device; and
at least one slave devices attached to the master device, wherein the master device comprises:

a second receiving unit, configured to receive an original packet sent by an upstream device before a first receiving unit receives a processed packet sent by a first slave device; and a second sending unit, configured to send a modified packet to the first slave device after an MPLS header that carries multi-diversion information is added to the original packet to generate the modified packet;

the first receiving unit, configured to receive the processed packet sent by the first slave device, wherein the processed packet comprises the MPLS header that carries multi-diversion information, the multi-diversion information comprises a multi-diversion identifier field, and the multi-diversion identifier field contains data indicating that there is a second slave device to which the processed packet needs to be diverted;

a determining unit, configured to determine, according to the multi-diversion identifier field, the second slave device to which the processed packet needs to be diverted; and a first sending unit, configured to send the processed packet to the second slave device;

the determining unit is specifically configured to start searching from one end of the multi-diversion identifier field according to the preset diversion order; when the first first value is found through searching, set the bit where the first first value found through searching is located to a second value; and then continue searching for a next first value; and if the next first value is found through searching, determine a slave device corresponding to a bit where the next first value is located as the second slave device; and the first sending unit is further configured to, when the determining unit finds no next first value through searching, determine a link indicated by the link number field, remove the MPLS header in the processed packet, and send, over the determined link, a packet in which the MPLS header has been removed; and the slave device is configured to receive the modified packet sent by the master device, and send the processed packet to the master device, wherein the processed packet comprises a multi-protocol label switching MPLS header that carries multi-diversion information.

* * * * *